United States Patent
Yin et al.

(10) Patent No.: US 11,013,370 B2
(45) Date of Patent: May 25, 2021

(54) HEATING CONTROL METHOD FOR CONTROLLING FOOD PROCESSOR AND A HEATING CONTROL DEVICE THEREOF

(71) Applicants: GUANGDONG MIDEA CONSUMER ELECTRIC MANUFACTURING CO., LTD., Foshan (CN); MIDEA GROUP CO., LTD., Foshan (CN)

(72) Inventors: Kunren Yin, Foshan (CN); Weijun Qiao, Foshan (CN); Shuangjiang Xu, Foshan (CN); Bin Chen, Foshan (CN)

(73) Assignees: GUANGDONG MIDEA CONSUMER ELECTRIC MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 412 days.

(21) Appl. No.: 15/968,659

(22) Filed: May 1, 2018

(65) Prior Publication Data
US 2018/0242792 A1    Aug. 30, 2018

Related U.S. Application Data

(63) Continuation of application No. PCT/CN2017/091502, filed on Jul. 3, 2017.

(30) Foreign Application Priority Data

Jul. 7, 2016    (CN) .......................... 201610532607.3

(51) Int. Cl.
*A47J 43/00*    (2006.01)
*A47J 43/07*    (2006.01)
(Continued)

(52) U.S. Cl.
CPC ............... *A47J 43/07* (2013.01); *A47J 36/00* (2013.01); *A47J 36/32* (2013.01); *G05D 23/30* (2013.01)

(58) Field of Classification Search
CPC . A47J 43/07; A47J 36/00; A47J 36/32; G05D 23/30
See application file for complete search history.

(56) References Cited

U.S. PATENT DOCUMENTS

| | | | |
|---|---|---|---|
| 2006/0044935 A1 | 3/2006 | Benelli et al. | |
| 2011/0186668 A1* | 8/2011 | Seidler | A47J 36/02 241/98 |
| 2016/0262422 A1* | 9/2016 | Biglari | A23G 9/12 |

FOREIGN PATENT DOCUMENTS

| CN | 201160756 Y | 12/2008 |
|---|---|---|
| CN | 101406372 A | 4/2009 |

(Continued)

OTHER PUBLICATIONS

CN104510353A machine translation (Year: 2013).*
(Continued)

*Primary Examiner* — Anshu Bhatia
(74) *Attorney, Agent, or Firm* — Morgan, Lewis & Bockius LLP

(57) ABSTRACT

A method for controlling a food processor is disclosed. During a heating process of the food processor, a temperature in a cup of the food processor is obtained at a predefined time interval. Whenever the obtained temperature in the cup reaches a current preset temperature threshold, the food processor starts a stirring operation for a first preset time period and stops after that, until the obtained temperature in the cup is greater than an upper limit of the preset temperature threshold. The preset temperature threshold is adjusted and defined as the current preset temperature threshold every time before the food processor starts the stirring operation. A heating control device for controlling the food processor is further disclosed, with the heating control method thereof to solve a problem of a low accuracy in heating control that (Continued)

is caused by an unbalanced temperature in the cup of the food processor during the heating process.

10 Claims, 5 Drawing Sheets

(51) Int. Cl.
*G05D 23/30* (2006.01)
*A47J 36/32* (2006.01)
*A47J 36/00* (2006.01)

(56) References Cited

FOREIGN PATENT DOCUMENTS

| CN | 101554215 A | 10/2009 |
|---|---|---|
| CN | 102762135 A | 10/2012 |
| CN | 202801342 U | 3/2013 |
| CN | 103006063 A | 4/2013 |
| CN | 103222796 A | 7/2013 |
| CN | 103932591 A | 7/2014 |
| CN | 104510353 A | 4/2015 |
| CN | 104684442 A | 6/2015 |
| CN | 105725859 A | 7/2016 |
| JP | 2003199520 A | 7/2003 |
| KR | 1998030848 A | 7/1998 |

OTHER PUBLICATIONS

CN201160756 machine translation (Year: 2016).*
Guangdong Midea Consumer Electrics Manufacturing Co. Ltd. et al., Extended European Search Report, EP17823590.9, dated Jul. 31, 2018, 9 pgs.
Office Action, CN201610532607.3, dated Mar. 3, 2020, 5 pgs.
Notification of Reason for Refusal, KR10-20177034250, dated Jul. 29, 2019 , 3 pgs.
Midea, International Search Report and Written Opinion, PCT/CN2017/091502, dated Aug. 30, 2017, 16 pgs.
Office Action, CN201610532607.3, dated May 28, 2019, 6 pgs.—No English Translation Available.

* cited by examiner

HEATING CONTROL METHOD FOR CONTROLLING FOOD PROCESSOR AND A HEATING CONTROL DEVICE THEREOF

RELATED APPLICATIONS

This application is a continuation application of PCT Patent Application No. PCT/CN2017/091502, entitled "HEATING CONTROL METHOD FOR CONTROLLING FOOD PROCESSOR AND A HEATING CONTROL DEVICE THEREOF" filed on Jul. 3, 2017, which claims priority to Chinese Patent Application No. 201610532607.3, filed with the Chinese Patent Office on Jul. 7, 2016, and entitled "HEATING CONTROL METHOD FOR CONTROLLING FOOD PROCESSOR AND A HEATING CONTROL DEVICE THEREOF", both of which are incorporated herein by reference in their entirety.

TECHNICAL FIELD

The present disclosure relates to a field of food processing, especially relates to a heating control method of a food processor and a heating control device thereof.

BACKGROUND

A blender with heating function is a new type of food processor, heating and stirring operation are provided simultaneously so that the food processing functions such as cooking porridge, rice paste and soybean milk that need to be heated can be accomplished. However, during the heating process, due to the position of a heater, as well as the accumulations of food in the stirring cup, the temperature in the cup is uneven and unbalanced, the temperature is higher at the regions that are near the heater, while the temperature is lower at the regions that are far away from the heater. If the temperature detecting device is installed near the region of the heater, when the temperature detected by the temperature detecting device is a predetermined temperature T, the food temperature in the regions far away from the heater is far below the temperature T; if the temperature detecting device is installed far away from the regions of the heater, when the temperature detected by the temperature detecting device is T, the food temperature in the regions near the heater may be far higher than T; thus the temperature in the cup is unbalanced, a local temperature would be very high while the other regions are at lower temperature, so the detected temperature by the temperature detecting device is not in conformity with the real temperature, resulting in the low accuracy of heating control of the blender and damaging the process of cooking the food.

SUMMARY

The present disclosure relates to a heating control method of a food processor and a heating control device thereof, aims to solve a problem of a low accuracy in heating control that is caused by the unbalanced temperature in a cup of a food processor during a heating process.

To realize the above aim, the present disclosure relates to a heating control method of the food processor and the heating control device thereof, the heating control method for controlling the food processor includes:

obtaining a temperature in a cup of the food processor, that is detected by a temperature detecting device of the food processor at a predefined time interval in a heating process of the food processor, in accordance with a determination that the obtained temperature in the cup reaches a current preset temperature threshold, controlling the food processor to start a stirring operation for a first preset time period and stop, until the obtained temperature in the cup is greater than an upper limit value of the preset temperature threshold;

wherein the preset temperature threshold is adjusted each time the food processor starts the stirring operation, and defining the adjusted preset temperature as the current preset temperature threshold thereinto, the adjusted preset temperature threshold is greater than or equal to a previous preset temperature threshold.

Optionally, an adjustment of the preset temperature threshold, adjusting the preset temperature threshold, a process of wherein the preset temperature threshold is adjusted each time the food processor starts the stirring operation, and defining the adjusted preset temperature as the current preset temperature threshold, includes a following step:

the preset temperature threshold is adjusted according to the first preset temperature difference, defining the adjusted preset temperature as the current preset temperature threshold.

Optionally, the adjustment of the preset temperature threshold, the process of defining the adjusted preset temperature threshold as the current preset temperature threshold includes the following steps.

Obtaining a second temperature difference corresponded to the preset temperature threshold, if the preset temperature threshold is greater, and a corresponding second temperature is greater.

The preset temperature threshold is adjusted according to the second preset temperature difference, defining the adjusted preset temperature as the current preset temperature threshold.

Optionally, the heating control method of food processor further includes the following step.

During the heating process of the food processor, when detecting that the stirring operation is working, then controlling the food processor to stop heating; when detecting that the stirring operation of the food processor stops, then controlling the food processor to resume heating.

Optionally, the heating control method of food processor further includes following step.

When the detected temperature in the cup is greater than the upper limit value of the preset temperature threshold, controlling the food processor to continue heating and to stop after a second preset time.

Optionally, an initial value of the preset temperature threshold is set to be greater than or equal to 40° C., the upper limit value is less than or equal to 95° C. a frequency of start the stirring operation of the food processor is controlled to be less than 20 times, and the first preset temperature is determined according to the initial value of the preset temperature threshold, the upper limit value of the preset temperature and the total times.

Furthermore, to realize the above aim, the present disclosure also relates to a heating control device for controlling the food processor, the heating control device for controlling the food processor includes:

a temperature acquisition module, configured to obtain the temperature in the cup that is detected by a temperature detecting device of the food processor at the regular time, during the heating process of the food processor;

a stirring control module, configured for controlling the food processor to start the stirring operation and to stop the stirring operation after the first preset time, whenever an obtained temperature in the cup reaches the current preset temperature threshold, until the obtained temperature in the cup is greater than the upper limit of the preset temperature threshold;

a threshold adjustment module, configured to adjust the preset temperature threshold each time before the food processor starts the stirring operation, and the adjusted preset temperature being defined as the current preset temperature threshold, the adjusted preset temperature threshold is greater than or equal to the previous preset temperature threshold.

Optionally, the threshold adjustment module is also used to adjust the preset temperature threshold according to the first preset temperature difference. The adjusted preset temperature is defined as the current preset temperature threshold.

Optionally, the threshold adjustment module includes:

a temperature difference acquisition unit, configured to obtain the second temperature difference corresponded to the preset temperature threshold, the greater the preset temperature threshold, the greater the corresponding second temperature difference;

a threshold adjustment unit, configured to adjust the preset temperature threshold according to the second preset temperature difference, defining the adjusted preset temperature as the current preset temperature threshold.

Optionally, the heating control device for controlling the food processor further includes:

a first control module, during the heating process of the food processor, if detecting the stirring operation is on, then to suspend the food processor from heating; when detecting that the stirring operation of the food processor stops, then the food processor is controlled to heat continually.

Optionally, the heating control device for controlling the food processor further includes:

a second control module, after determining that the detected temperature in the cup is greater than the upper limit value of the preset temperature threshold, controlling the food processor to continue heating and to stop after the second preset time.

Optionally, the initial value of the preset temperature threshold is set to be greater than or equal to 40° C., the upper limit value is less than or equal to 95° C. a total times of starting the stirring operation of the food processor is set to be less than 20 times.

The threshold adjustment module also used to determine the first preset temperature difference according to the initial value of the preset temperature threshold, the upper limit value of the preset temperature and the frequency of starting the stirring operation.

The present disclosure relates to the heating control method for controlling the food processor and the device thereof, regularly detecting the temperature in the cup during the heating process of the food processor, whenever the obtained temperature in the cup is greater than the current preset temperature threshold, controlling the food processor to start the stirring operation and to stop stirring after the first preset time. The temperature in the cup is equalized by stirring until the detected temperature in the cup is greater than the upper limit value of the preset temperature threshold, wherein the preset temperature threshold is adjusted each time the food processor starts the stirring operation, the adjusted preset temperature threshold is greater than or equal to the previous preset temperature threshold, and the adjusted preset temperature being defined as the current preset temperature threshold, that is, during the heating process, according to the detected temperature in the cup to start the stirring operation at intervals to balance the temperature in the cup. When the stirring operation is started, the preset temperature threshold is adjusted, and the adjusted preset temperature threshold is defined as the current temperature threshold, which is used as the judgment basis for starting the next stirring, until the detected temperature in the cup is greater than the upper limit value of the preset temperature. The method and the device of the present disclosure avoid a situation of that a local temperature in the cup is high while other regions are in low temperature during the heating process, to balance the temperature in the cup by intermittent stirring, thus improving the accuracy of heating control of the food processor.

Objective achieving, function features, and advantages of the present disclosure are further described with reference to the embodiments and the accompany drawings.

DETAILED DESCRIPTION OF THE EMBODIMENTS

It should be understood that the specific embodiments described below are only used to explain the present disclosure and are not intended to limit the present disclosure.

Figure 1:
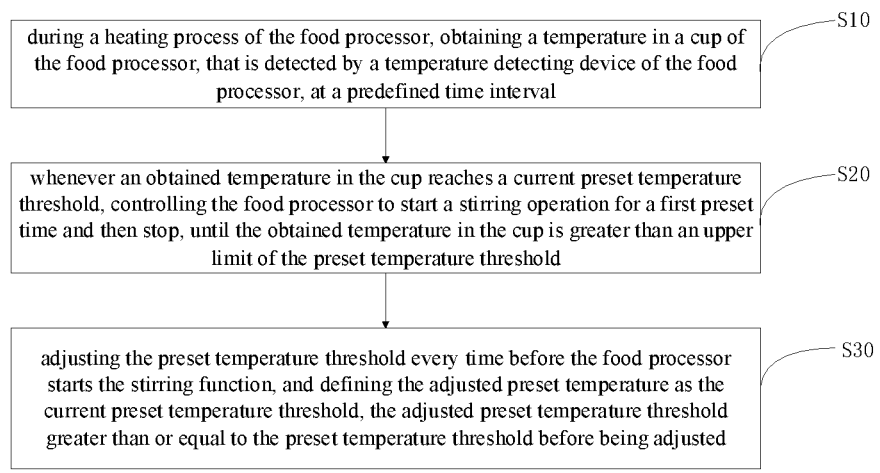
FIG. 1 is a flow diagram of a heating control method for controlling a food processor in the first embodiment of the present disclosure.

The present disclosure relates to a heating control method for controlling food processor. With reference to FIG. 1, FIG. 1 is a flow diagram of a heating control method for controlling a food processor in a first embodiment of the present disclosure.

In the present embodiment, the heating control method for controlling the food processor includes:

step S10, during a heating process of the food processor, obtaining the temperature in the cup, that is detected by the temperature detecting device of the food processor, at the regular time.

It should to be note that, the heating control method for controlling the food processor of the present disclosure can be applied to the food processor with a heating and a stirring operation, such as soybean milk machines, juicers, grinding machines etc.

For a general food processor, a heating device is provided on a bottom of a stirring cup, during the heating process, with an operation of the heating device, the food temperature in the cup increases gradually from the bottom to a top. However, the temperature detecting device is usually provided on the regions that are near the heating device, or is provided on the regions that are far away from the heating device; therefore, the detected temperature by the temperature detector is not equal to the actual average temperature in the cup, when the food processor starts the heating control, usually taking the temperature that is detected by the temperature detecting device as one of judgment bases. For instance, detecting a boiling of food in the cup, when the detected temperature by the temperature detector reaches the preset boiling point, then the food in the cup is considered to be boiled and the food processor is controlled to run a next operational phase. However, if the temperature detecting device is installed on regions that are close to the heating device, the temperature of the regions which is detected by the temperature detecting device has reached the boiling point, but the food temperature in the regions that are far away from the heating device, has not reached the boiling point yet. That is, at this moment the food in the cup does not actually reach the boiling point, which results in a miscarriage of justice to the heating state of the food processor for food, and which leads to a low accuracy of heating control.

The method in the present embodiment, during the heating process of the food processor, in real time or regularly detecting the temperature in the cup of the food processor, for example, to obtain the temperature detected by the temperature detecting device that is provided in the food processor at 2 to 5 seconds per interval. In another embodiment, the time interval of regularly detecting the temperature in the cup can be set greater than the first preset time.

Step S20, in accordance with a determination that the obtained temperature in the cup reaches a current preset temperature threshold, controlling the food processor to start the stirring operation and to stop after the first preset time, until the obtained temperature in the cup is greater than an upper limit of the preset temperature threshold;

step S30, adjusting the preset temperature threshold before the food processor starts the stirring operation, and the adjusted preset temperature being defined as the current preset temperature threshold, the adjusted preset temperature threshold is greater than or equal to a previous preset temperature threshold.

When the temperature detected by the temperature detecting device in the cup is obtained, comparing the obtained temperature in the cup with the preset temperature threshold, if the temperature in the cup is greater than the current preset temperature threshold, and then the stirring operation is started then stopped after the first preset time, to decrease the temperature of the regions that are near the heating device and to increase the temperature on the regions that are far away from the heating device, thus making the overall temperature reach an equilibrium in the cup, thereinto, the first preset time is set up by users according to the actual needs, such as 10 to 30 seconds etc. Furthermore, with the effect of the heating device, the temperature in the cup may increase again, therefore adjust the preset temperature threshold after the stirring is finished, let the adjusted temperature threshold be greater than or equal to the preset temperature threshold. And the adjusted temperature is defined as the current preset temperature threshold. If the detected temperature is greater than the current preset temperature threshold once again, then start the stirring operation to stir the food, recurrently, until the detected temperature by the temperature detecting device is greater than an upper limit value of the preset temperature threshold.

The adjustment of the preset temperature value may have various embodiments and two of them are listed below, in one embodiment, the preset temperature threshold is adjusted according to the second preset temperature difference, and then defining the adjusted preset temperature as the current preset temperature threshold. Optionally, an initial value of the preset temperature threshold is set to be greater than or equal to 40° C., the upper limit value is less than or equal to 95° C. Controlling a frequency of starting the stirring operation of the food processor to be less than 20 times. The first preset temperature difference is determined according to the initial value of the preset temperature threshold, the upper limit value of the preset temperature and the frequency of starting the stirring operation. The preset temperature threshold is adjusted repeatedly to reach the upper limit value of the preset temperature threshold, while the total times cannot exceed 20. For example, the initial value of the preset temperature threshold is 50° C., the first preset temperature difference is 5° C., the upper limit value of the preset temperature threshold is 95° C., thus adjusting the preset temperature threshold to 55° C. after stirring by the first time, adjusting the preset temperature threshold to 60° C., and so on, until the detected temperature in the cup is greater than the upper limit value of the preset temperature threshold.

Here is a specific usage scenario to illustrate the heating control method for controlling the food processor proposed by this method. Taking the temperature detecting device provided in the regions that are near the heating device as an example, thereinto, the initial value of the preset temperature value is 50° C., the first preset temperature difference is 5° C., a first preset time period is 20 seconds, the upper limit value is 95° C. In the present embodiment, the preset temperature may be 50° C., 55° C., 60° C., 65° C., 70° C., 75° C., 80° C., 85° C., 90° C., and 95° C., successively.

During the heating process of the food processor, the detected temperature in the cup is obtained in real-time by the temperature detecting device; when the detected temperature in the cup reaches to 50° C., then the food processor is controlled to start the stirring operation and to stop after stirring for 20 seconds, the preset temperature value is increased by 5° C. and defined as the current preset temperature threshold, that is 55° C. After stirring, the temperature in the cup may reduce to under 50° C., such as 48° C., because the heating device is still heating, so the temperature in the cup will increase gradually. When the detected temperature in the cup reaches to 55° C., start the stirring operation again and stop after stirring for 20 seconds, and the preset temperature value is increased by 5° C. and defined as the current preset temperature threshold, that is 60° C. After stirring, the temperature in the cup may reduce to under 55° C., such as 53° C., because the heating device is still heating, so the temperature in the cup will gradually increase; when the temperature in the cup is reached 60° C., to start the stirring operation again, recurrently, until the detected temperature in the cup is reached the upper limit value of the preset temperature threshold of 95° C., then stopped stirring. Preferably, in one embodiment, the initial value of the preset temperature threshold may be set as 75 to 85° C., the first preset temperature difference is 1 to 3° C.

Thereinto, for judging whether the temperature in the cup reaches the current preset temperature threshold or not, when the detected temperature in the cup is greater than or equal to the current preset temperature threshold and then the temperature in the cup is considered to reach the current preset temperature threshold.

Figure 2:
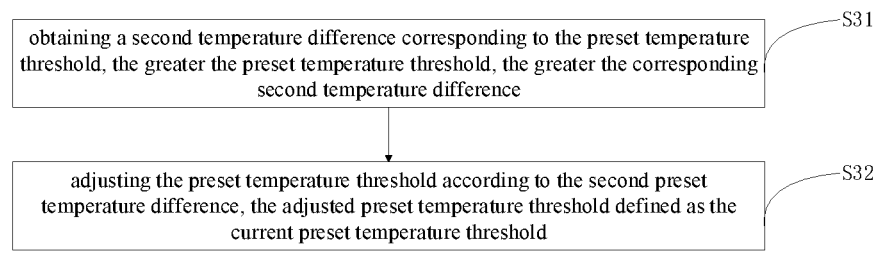
FIG. 2 is a flow diagram of detailed steps of adjusting a preset temperature threshold of the heating control method for controlling the food processor in the first embodiment of the present disclosure.

With reference to FIG. 2, in other embodiments, adjusting the preset temperature threshold, a process of wherein the preset temperature threshold is adjusted each time the food processor starts the stirring operation, and defining the adjusted preset temperature as the current preset temperature threshold, includes the following detailed steps:

step S31, obtaining the second temperature difference corresponded to the preset temperature threshold, the greater the preset temperature threshold, the greater the corresponding second temperature difference;

step S32, the preset temperature threshold is adjusted according to the second preset temperature difference, defining the adjusted preset temperature as the current preset temperature threshold.

With the heating process and the intermittently start of the stirring operation, making an overall temperature in the cup tend balance gradually. In the present embodiment, a second preset temperature difference is provided to correspond with every preset temperature threshold, with the increase of the preset temperature threshold, the second temperature difference also increases gradually.

Below is another specific usage scenario to illustrate the heating control method for controlling the food processor that is proposed in the present embodiment. Taking the temperature detecting device provided in the regions that are near the heating device as the example, thereinto, the first preset time is 20 seconds, the initial value of the preset temperature threshold is 50° C., and the corresponding second preset temperature difference is set to 5° C.; after adjusted for the first preset time, the preset temperature threshold is adjusted to 55° C., and the corresponding second preset temperature difference is set to 7° C.; after adjusted for a second preset time, the preset temperature threshold is adjusted to 62° C., and the corresponding second preset temperature difference is set to 9° C., and so on; thereinto, the second preset temperature difference needs to set previously, that is, in the present embodiment, the preset temperature threshold is increased step by step. The upper limit value of the preset temperature is 95° C. In the present embodiment, the preset temperature may be 50° C., 55° C., 62° C., 71° C., 82° C. and 95° C., successively.

During the heating process of the food processor, the detected temperature in the cup is obtained in real-time by the temperature detecting device, when the detected temperature in the cup reaches to 50° C., controlling the food processor to start the stirring operation again and to stop after 20 seconds, the preset temperature is increased by 5° C. and is defined as the current preset temperature threshold, that is 55° C.; after stirring, the temperature in the cup may be reduced to below 50° C., such as 48° C., owing to the heating device is still heating, so the temperature in the cup may gradually increase; when the temperature in the cup reaches to 55° C., controlling the food processor to start the stirring operation again and to stop after 20 seconds, the preset temperature is increased by 7° C. and is defined as the current preset temperature threshold, that is 62° C.; after stirring, the temperature in the cup may reduce to below 55° C., such as 53° C., owing to the heating device is still heating, so the temperature in the cup will gradually increase; when the temperature in the cup reaches 62° C., to start the stirring operation again, recurrently, until the detected temperature in the cup is reached to the upper limit value of the preset temperature threshold of 95° C., then stop stirring.

In other embodiments, the adjusted preset temperature threshold may be equal to the prior preset temperature threshold by adjusting the preset temperature threshold within one or two times, such as, the preset temperature threshold is 50° C., 55° C., 60° C., 60° C., 65° C., 70° C., 70° C., 75° C., 80° C., 85° C., 90° C. and 95° C., successively. The specific control process is basically the same with the foregoing embodiments, and no more details are given here.

It is understandable that, in some embodiments, the temperature detecting device may provide on the regions that are far away from the heating device, therefore, the temperature in the cup may increase after stirring, in these embodiments, the time interval of regularly detecting the temperature in the cup may set to be greater than the first preset time, to improve the accuracy of the heating control.

It is understandable that, in an embodiment, even though the stirring operation is on, the heating device of the food processor keeps heating, in this way, to improve the heat efficiency and reduce the heating time, making the temperature in the cup reach the preset temperature as soon as possible; in other embodiments, the heating may be suspended even when the stirring operation of the food processor is on, and the heating is continued when the stirring is finished, in this way, to reduce the stirring time, which is the first preset time, thus realizing a rapid equilibrium of the overall temperature in the cup. Specifically, during the heating process of the food processor, if the stirring operation is detected on working, then to suspend the food processor from heating. If the stirring operation of the food processor is detected with stopping work, then the food processor is controlled to heat continually.

It should be note that, the temperature value listed in the foregoing embodiment is just to give an illustration, the present disclosure is not limit to this, thereinto, relevant parameters of the food processor, such as the first preset time, the first preset temperature difference, the second preset temperature difference etc., may be set before leaving factory, for example, a better value may be obtained from the simulation experiment.

Furthermore, the boiling point of the food may be used as the upper limit value of the preset temperature threshold.

The present embodiment relates to the heating control method for controlling the food processor, regularly detecting the temperature in the cup during the heating process of the food processor. Whenever the obtained temperature in the cup is greater than the current preset temperature threshold, then the food processor is controlled to start the stirring operation and to stop after the first preset time, the temperature in the cup is equalized by stirring until the detected temperature in the cup is greater than the upper limit value of the preset temperature threshold, adjusting the preset temperature threshold every time before the food processor starts a stirring operation. The adjusted preset temperature threshold is greater than or equal to the previous preset temperature threshold, and defining the adjusted preset temperature as the current preset temperature threshold. That is, during the heating process, according to the detected temperature in the cup to start the stirring operation at intervals to balance the temperature in the cup. When the stirring operation is started, the preset temperature threshold is adjusted, and then the adjusted preset temperature threshold is defined as the current temperature threshold, using as the judgment basis for starting the next stirring, until the detected temperature in the cup is greater than the upper limit value of the preset temperature. The method of the present disclosure avoids a situation of that a local temperature in the cup is high while other regions are in low temperature during the heating process, the temperature of the cup is balanced by intermittent stirring and the accuracy of heating control of the food processor is improved.

A second embodiment of the heating control method of the present disclosure is proposed based on the first embodiment. The heating control method of controlling the food processor further includes the following steps:

after determining that the detected temperature in the cup is greater than the upper limit value of the preset temperature threshold, controlling the food processor to continue heating and to stop after the second preset time.

When the temperature in the cup reaches the upper limit value of the preset temperature threshold, the overall temperature in the cup of the food processor is high and may even have reached the boiling point; thereinto, the food needs to continue heating for a certain time and keeps boiling for a period time, thus the food is cooked. Therefore, in the present embodiment, when the detected temperature in the cup is greater than the preset temperature threshold, controlling the food processer to continue heating and to stop after the second preset time; thereinto, different food needs different heating time, so the food information may be obtained from cooking patterns that are selected by users. And then, according to the food information, the second preset time is set. In other embodiments, based on the cooking mode that is selected by the users, after determining that the detected temperature in the cup is greater than the upper limit value of the preset temperature threshold, the food processor executing a follow workflow is controlled according to a cooking curve of the cooking mode.

The present disclosure also relates to a heating control device for controlling the food processor.

Figure 3:
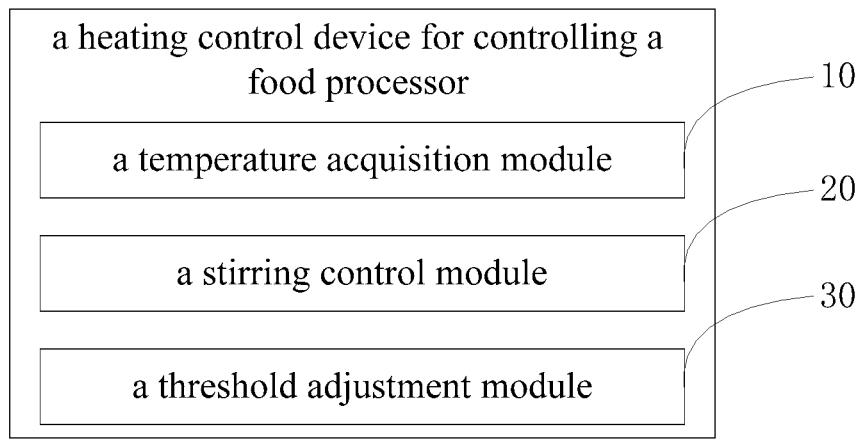
FIG. 3 is a block diagram of the heating control method for controlling the food processor in the first embodiment of the present disclosure.

With reference to FIG. 3, FIG. 3 is a block diagram of the heating control method for controlling the food processor in the first embodiment of the present disclosure.

In this embodiment, the heating control device for controlling the food processor includes:

a temperature acquisition module 10, configured to obtain the temperature in a container that detected by a temperature detecting device of the food processor at the regular time, during the heating process of the food processor.

It should be noted that the heating control method for controlling the food processor of the present disclosure may be applied to the food processor with heating and stirring operation, such as soybean milk machine, juicer, grinding machine etc.

For a general food processor, the heating device is provided on a bottom of the stirring cup, during the heating process, with the operation of the heating device, the food temperature in the cup increases gradually from the bottom to the top. However, the temperature detecting device is usually provided on the regions that are near the heating device, or provided on the regions that are far away from the heating device. Therefore, the temperature detected by the temperature detector is not equal to the actual average temperature in the cup, when the food processor carries out the heating control process, usually takes the detected temperature of the temperature detecting device as one of the judgment bases. For example, for detecting a boiling of food in the cup, when the detected temperature of the temperature detector reaches the preset boiling point, then the food in the cup is considered to have been boiled with consequently controlling the food processor to work in a next operational phase. However, if the temperature detecting device is installed on the regions that are close to the heating device, the temperature of the regions that are detected by the temperature detecting device has reached to the boiling point, but the food temperature of the regions that are far away from the heating device has not reached to the boiling point yet, this moment the food in the cup has not actually reached to the boiling point, resulting in a miscarriage of justice to the heating state of the food processor for food, which causes a low accuracy of the heating control.

During the heating process of the food processor, the temperature acquisition module detects the temperature inside the cup of the food processor in real time or timing, for example, the temperature that is detected by the temperature detecting device, is obtained by the temperature acquisition module 10, at 2 to 5 seconds per interval, and the temperature detecting device is provided in the food processor. In another embodiment, the time interval of timing obtains the temperature in the cup may be set greater than the first preset time.

A stirring control module 20 is configured for when the obtained temperature in the cup reaches the current preset temperature threshold, controlling the food processor to start the stirring operation and to stop after the first preset time, until the obtained temperature in the cup is greater than the upper limit of the preset temperature threshold;

A threshold adjustment module 30 is configured to adjust the preset temperature threshold each time before the food processor starts the stirring operation, and the adjusted preset temperature being defined as the current preset temperature threshold, the adjusted preset temperature threshold is greater than or equal to the previous preset temperature threshold.

When the temperature detected by the temperature detecting device in the cup is obtained, comparing the obtained temperature in the cup with the preset temperature threshold. If the temperature in the cup is greater than the current preset temperature threshold, then start the stirring operation and stop stirring after the first preset time so as to decrease the temperature on the regions that are near the heating device and to increase the temperature on the regions that are far away from the heating device, which makes the overall temperature reaches equilibrium in the cup. Thereinto, the first preset time is set up by the users according to the actual needs, such as 10 to 30 seconds etc. Furthermore, with the effect of the heating device, the temperature in the cup will increase again, therefore, adjusting the preset temperature threshold after the stirring is finished and letting the adjusted temperature threshold greater than or equal to the preset temperature threshold, and defining the adjusted temperature as the current preset temperature threshold. If the detected temperature is greater than the current preset temperature threshold once again, then start the stirring operation to stir the food, recurrently, until the detected temperature of the temperature detecting device is greater than the upper limit value of the preset temperature threshold.

The adjustment of the preset temperature threshold may have various embodiments and two of them are listed below, in one embodiment, the preset temperature threshold is adjusted according to the second preset temperature difference, and then defining the adjusted preset temperature as the current preset temperature threshold. Optionally, the initial value of the preset temperature threshold is set to be greater than or equal to 40° C., the upper limit value is less than or equal to 95° C. a total times of starting the stirring operation of the food processor is set to be less than 20 times, the first preset temperature difference is determined by the threshold adjustment module, according to the initial value of the preset temperature threshold, the upper limit value of the preset temperature and the frequency of starting the stirring operation. The preset temperature threshold is adjusted repeatedly to reach the upper limit value of the preset temperature threshold, while the total times of adjustment cannot exceed 20. For example, the initial value of the preset temperature threshold is 50° C., the first preset temperature difference is 5° C., the upper limit value of the preset temperature threshold is 95° C., so that the preset temperature threshold is adjusted to 55° C. by the preset temperature threshold after stirring by the first time, and the preset temperature threshold is adjusted to 60° C. by the preset temperature threshold after stirring by the second time and so on, until the detected temperature in the cup is greater than the upper limit value of the preset temperature threshold.

Here is a specific usage scenario to illustrate the heating control device for controlling the food processor proposed by this method. Taking the temperature detecting device as an example, thereinto, the initial value of the preset temperature threshold is 50° C., the first preset temperature difference is 5° C., the first preset time is 20 seconds, the upper limit value is 95° C. In the present embodiment, the preset temperature threshold is 50° C., 55° C., 60° C., 65° C., 70° C., 75° C., 80° C., 85° C., 90° C. and 95° C., successively.

During the heating process of the food processor, the temperature acquisition module 10 obtains the detected temperature in the cup by the temperature detecting device in real-time, when the detected temperature in the cup reaches 50° C., the stirring control module 20 controls the food processor to start the stirring operation and to stop after 20 seconds, increasing the preset temperature by 5° C. and is defined as the current preset temperature threshold, that is 55° C., after stirring, the temperature in the cup may reduce to below 50° C., such as 48° C. Owing to the heating device is still heating, so the temperature in the cup will gradually increase. When the temperature in the cup reaches 55, starting the stirring operation again, stopping after 20 seconds, increasing the preset temperature by 5° C. and then the increased temperature is defined as the current preset temperature threshold, that is 60° C., after stirring, the temperature in the cup may reduce to under 55° C., such as 53° C. Owing to the heating device is still heating, so the temperature in the cup will gradually increase. When the temperature in the cup reaches 62° C., starting the stirring operation again, recurrently, until the detected temperature in the cup reaches the upper limit value of the preset temperature threshold of 95° C., then stops stirring. Preferably, in some embodiments, the initial value of the preset temperature threshold may be set as 75 to 85° C., the first preset temperature difference is 1 to 3° C.

Thereinto, for judging whether the temperature in the cup reaches the current preset temperature threshold or not, when the detected temperature in the cup is greater than or equal to the current preset temperature threshold and then the temperature in the cup is considered to have reached the current preset temperature threshold.

Figure 4:
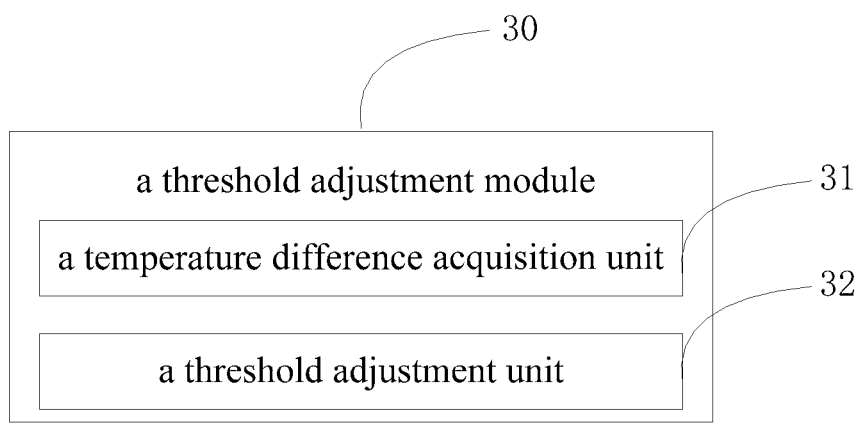
FIG. 4 is a block diagram of the threshold adjustment module the heating control method for controlling the food processor in the first embodiment of the present disclosure.

With reference to FIG. 4, in other embodiments, the threshold adjustment module 30 includes the following detailed units.

The temperature difference acquisition unit 31 is configured to obtain the second temperature difference corresponded to the preset temperature threshold; thereinto, the great the preset temperature threshold is, the great the corresponding second temperature is.

A threshold adjustment unit 32, configured to adjust the preset temperature threshold according to the second preset temperature difference, defining the adjusted preset temperature as the current preset temperature threshold.

With the heating process and the intermittently start of stirring operation, making the overall temperature in the cup gradually tend to balance, in the present embodiment, a second preset temperature difference is provided to correspond with every preset temperature threshold. With the increasing of the preset temperature, the second temperature difference also increases gradually.

Here is another specific usage scenario to illustrate the heating control device for controlling the food processor proposed by this embodiment. Taking the temperature detecting device provided in the regions that are near the heating device as the example, thereinto, the first preset time is 20 seconds, the initial value of the preset temperature threshold is 50° C., and the corresponding second preset temperature difference is set to 5° C.; after adjusting for the first preset time, the preset temperature threshold is adjusted to 55° C., the corresponding second preset temperature difference is set to 7° C.; after adjusted for the second preset time, the preset temperature threshold is adjusted to 62° C., the corresponding second preset temperature difference is set to 9° C., and so on; thereinto, the second preset temperature difference needs to set previously, that is, in the present embodiment, the preset temperature threshold is increased step by step. The upper limit value of the preset temperature is 95° C. In the present embodiment, the preset temperature threshold is 50° C., 55° C., 62° C., 71° C., 82° C. and 95° C., successively.

During the heating process of the food processor, the temperature acquisition module 10 obtains the detected temperature in the cup by the temperature detecting device in real-time, when the detected temperature in the cup reaches 50° C., the stirring control module 20 controls the food processor to start the stirring operation and to stop after 20 seconds, the threshold adjustment module 30 raises the preset temperature by 5° C., and the raised present temperature is defined as the current preset temperature threshold, that is 55° C., after stirring, the temperature in the cup may reduce to under 50° C., such as 48° C., owing to the heating device is still heating, so the temperature in the cup will gradually increase. When the temperature in the cup reaches 55° C., starting the stirring operation again, then the food processor stops after 20 seconds, increasing the preset temperature by 7° C. and is defined as the current preset temperature threshold, that is 62° C., after stirring, the temperature in the cup may reduce to under 55° C., such as 53° C., owing to the heating device is still heating, so the temperature in the cup will gradually increase. When the temperature in the cup reaches 62° C., and the stirring operation is started again, recurrently, until the detected temperature in the cup reaches the upper limit value of the preset temperature threshold of 95° C., and then the stirring process is stopped.

In other embodiments, the adjusted preset temperature threshold may be equal to the prior preset temperature threshold by adjusting the preset temperature threshold within one or two times, such as, the preset temperature threshold is 50° C., 55° C., 60° C., 60° C., 65° C., 70° C., 70° C., 75° C., 80° C., 85° C., 90° C. and 95° C., successively. Its specific control process is basically the same as the foregoing embodiments, and no more details are given here.

It is understandable that, in some embodiments, the temperature detecting device may be provided on the regions that are far away from the heating device, therefore, the temperature in the cup may increase after stirring. In these embodiments, the time interval of obtaining the temperature in the cup at regular time may be set to greater than the first preset time, to improve the accuracy of the heating control.

It is understandable that, in an embodiment, even though the stirring operation is on, the heating device of the food processor continues heating. In this way, improving the heating efficiency and reducing the heating time, make the temperature in the cup reach the preset temperature as soon as possible. In other embodiments, the heating control device for controlling the food processor also includes the first control module, during the heating process of the food processor, to suspend the food processor from heating if the stirring operation is detected on working. If detecting the stirring operation of the food processor stops working, the food processor is controlled to heat continually. The heating device of the first control module may be suspended even when the stirring operation of the food processor is on, the heating device of the first control module continues heating when the stirring is stopped, in this way, to reduce the stirring time, that is the first preset time, thus realizing a rapid equilibrium of the overall temperature in the cup.

It should be note that, the temperature values in the foregoing embodiment are merely listed for illustration, the present disclosure is not limit to this, thereinto, the relevant parameters, such as the first preset time, the first preset temperature difference, the second preset temperature difference etc., can be set before the food processor leaves a factory, for example, an appropriate value can be obtained from the simulation experiment.

Furthermore, the boiling point of the food may be defined as the upper limit value of the preset temperature threshold.

The present embodiment relates to the heating control method for controlling the food processor, regularly detecting the temperature in the cup during the heating process of the food processor, whenever the obtained temperature in the cup is greater than the current preset temperature threshold, the food processor is controlled to start the stirring operation and to stop after the first preset time, equilibrating the temperature in the cup by stirring, until the temperature in the cup is greater than the upper limit value of the preset temperature threshold, wherein the preset temperature threshold is adjusted each time the food processor starts the stirring operation, the adjusted preset temperature threshold is greater than or equal to the previous preset temperature threshold, and defining the adjusted preset temperature as the current preset temperature threshold, that is, during the heating process, according to the detected temperature in the cup, the stirring operation is started at intervals to balance the temperature in the cup. When the stirring operation is started, the preset temperature threshold is adjusted, and the adjusted preset temperature threshold is defined as the current temperature threshold, using as the judgment basis for starting the next stirring until the detected temperature in the cup is greater than the upper limit value of the preset temperature. The device of the present disclosure avoids the situation that the local temperature in the cup is high while other regions are in low temperature during the heating process. The temperature in the cup is balanced by intermittently stirring, so as to improve the accuracy of heating control of the food processor.

Figure 5:
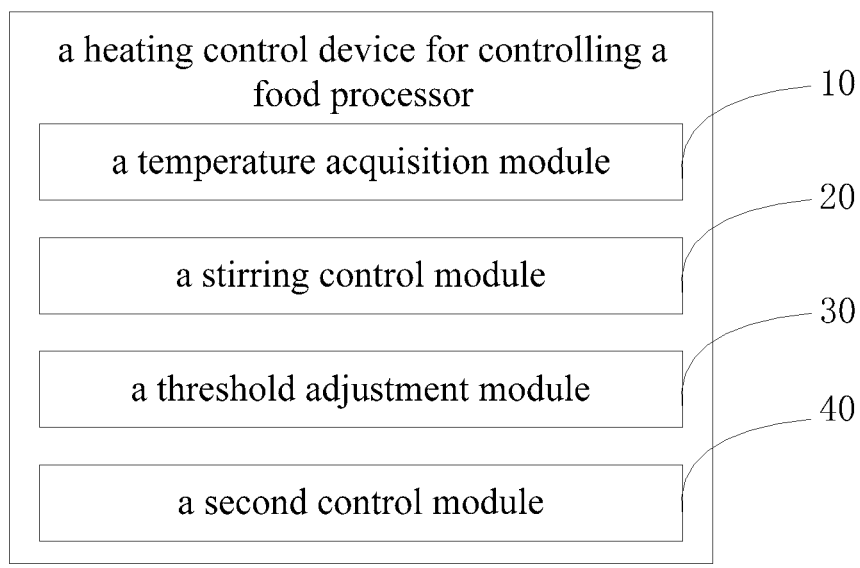
FIG. 5 is a block diagram of the heating control method for controlling the food processor in a second embodiment of the present disclosure.

A second embodiment of the heating control device of the present disclosure is proposed based on the first embodiment. With reference to FIG. 5, the heating control device for controlling the food processor further includes.

A second control module 40 is configured for after determining that the detected temperature in the cup is greater than the upper limit value of the preset temperature threshold, controlling the food processor to continue heating and to stop after the second preset time.

When the temperature in the cup reaches the upper limit value of the preset temperature threshold, the overall temperature in the cup of the food processor is high and may even have reached the boiling point; thereinto, the food needs to continue heating for a certain time and keeps boiling for a period time, thus cooking the food thoroughly; therefore, in the present embodiment, after determining that the detected temperature in the cup is greater than the upper limit value of the preset temperature threshold, and the food processer is controlled by the second control module 40 to continue heating and to stop after the second preset time; thereinto, different food needs different heating time, so the food information may be obtained from the cooking patterns that may be selected by the users, and the second preset time is determined according to the food information. In other embodiments, based on the cooking mode that is selected by the users, after determining that the detected temperature in the cup is greater than the upper limit value of the preset temperature threshold, the food processor is controlled to execute a following workflow according to a cooking curve of the cooking mode.

It should be noted that, in the present disclosure, terms of "include", "comprise" and any other variants of the like are used to cover the non-excludabilities, so that processes, methods, goods or devices which include a series of elements, not only include the elements, but also include the elements that ship to list clearly, or inherent elements in the processes, the methods, the goods and the devices. In the absence of more restrictions, the elements limited by a statement of "includes one . . . " and other similar elements are not excluded from the elements of the processes, the methods, the goods or the devices.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In the description of the present disclosure, "a plurality of" means at least two, such as two, three, and so on, unless specifically limited otherwise. When the combination of technical solution arises contradictory or cannot be achieved, the combination of such a technical solution should be considered as non-existent, and is not within the scope of the disclosure as claimed.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. A heating control method for controlling a food processor, comprising:
    during a heating process of the food processor, obtaining a temperature in a cup of the food processor, that is detected by a temperature detecting device of the food processor, at a predefined time interval; and
    in accordance with a determination that the obtained temperature in the cup reaches a current preset temperature threshold, controlling the food processor to start a stirring operation for a first preset time period and stop, until the obtained temperature in the cup of the food processor is greater than an upper limit of the preset temperature threshold, including:
        adjusting the preset temperature threshold each time the food processor starts the stirring operation, and defining an adjusted preset temperature threshold as the current preset temperature threshold, wherein the adjusted preset temperature threshold is greater than or equal to the preset temperature threshold before being adjusted.

2. The heating control method for controlling the food processor of claim 1, wherein adjusting the preset temperature threshold each time the food processor starts the stirring operation and defining the adjusted preset temperature threshold as the current preset temperature threshold comprises:

adjusting the preset temperature threshold according to a first temperature difference.

3. The heating control method for controlling the food processor of claim 2, wherein defining the adjusted preset temperature threshold as the current preset temperature threshold comprises:

obtaining a second temperature difference corresponding to the preset temperature threshold, wherein, the greater the preset temperature threshold, the greater the corresponding second temperature difference;

adjusting the preset temperature threshold according to the second temperature difference; and defining the adjusted preset temperature threshold as the current preset temperature threshold.

4. The heating control method for controlling the food processor of claim 2, further comprising:

during the heating process of the food processor, when detecting that the stirring operation is working, then controlling the food processor to stop heating; when detecting that the stirring operation of the food processor stops, then controlling the food processor to resume heating.

5. The heating control method for controlling the food processor of claim 3, further comprising:

during the heating process of the food processor, when detecting that the stirring operation is working, then controlling the food processor to stop heating; when detecting that the stirring operation of the food processor stops, then controlling the food processor to resume heating.

6. The heating control method for controlling the food processor of claim 3, further comprising:

during the heating process of the food processor, when detecting that the stirring operation is working, then controlling the food processor to stop heating; when detecting that the stirring operation of the food processor stops, then controlling the food processor to resume heating.

7. The heating control method for controlling the food processor of claim 1, further comprising:

after determining that the detected temperature in the cup is greater than the upper limit of the preset temperature threshold, controlling the food processor to resume heating for a second preset time and then stop.

8. The heating control method for controlling the food processor of claim 2, further comprising:

after determining that the detected temperature in the cup is greater than the upper limit of the preset temperature threshold, controlling the food processor to resume heating for a second preset time and then stop.

9. The heating control method for controlling the food processor of claim 3, further comprising:

when the detected temperature in the cup is greater than an upper limit of the preset temperature threshold, controlling the food processor to resume heating for a second preset time and then stop.

10. The heating control method for controlling the food processor of claim 2, wherein, an initial value of the preset temperature threshold is set to be greater than or equal to 40° C., an upper limit of the preset temperature threshold is set to be less than or equal to 95° C., a total times of starting the stirring operation of the food processor is set to be less than 20 times, and the preset temperature difference is determined according to the initial value of the preset temperature threshold, the upper limit of the preset temperature threshold and the total times.

* * * * *